(12) United States Patent
Doppstadt et al.

(10) Patent No.: US 9,409,365 B2
(45) Date of Patent: Aug. 9, 2016

(54) SCREW CONVEYOR

(75) Inventors: Johann Doppstadt, Velbert (DE); Horst Berger, Calbe/Saale (DE)

(73) Assignee: DOPPSTADT FAMILIENHOLDING GMBH, Velbert (DE)

( * ) Notice: Subject to any disclaimer, the term of this patent is extended or adjusted under 35 U.S.C. 154(b) by 670 days.

(21) Appl. No.: 13/821,802

(22) PCT Filed: Sep. 8, 2011

(86) PCT No.: PCT/EP2011/004537
§ 371 (c)(1),
(2), (4) Date: Mar. 8, 2013

(87) PCT Pub. No.: WO2012/031766
PCT Pub. Date: Mar. 15, 2012

(65) Prior Publication Data
US 2013/0167740 A1 Jul. 4, 2013

(30) Foreign Application Priority Data
Sep. 10, 2010 (DE) .................... 20 2010 012 454 U

(51) Int. Cl.
*B30B 9/12* (2006.01)
*B30B 11/24* (2006.01)
*B65G 33/26* (2006.01)

(52) U.S. Cl.
CPC ............... *B30B 9/121* (2013.01); *B30B 11/246* (2013.01); *B65G 33/26* (2013.01)

(58) Field of Classification Search
CPC ........ B30B 9/121; B30B 9/14; B30B 11/246; B04B 1/2008; B65G 33/26
USPC ................. 100/117, 145, 146; 198/657, 676; 494/54
See application file for complete search history.

(56) References Cited

U.S. PATENT DOCUMENTS

| | | | | |
|---|---|---|---|---|
| 2,480,419 A | * | 8/1949 | Patterson | A01B 9/003 172/119 |
| 3,485,341 A | | 12/1969 | Lutz' | |
| 3,762,537 A | | 10/1973 | Lutz | |
| 4,899,471 A | * | 2/1990 | Sasaki | E01H 5/098 37/233 |
| 5,279,407 A | * | 1/1994 | Shobak | B65G 33/265 198/677 |
| 5,429,581 A | * | 7/1995 | Michaud | B04B 1/2008 198/677 |
| 6,182,817 B1 | | 2/2001 | Rinker | |

FOREIGN PATENT DOCUMENTS

| | | |
|---|---|---|
| DE | 203 332 | 10/1908 |
| DE | 602 578 | 9/1934 |
| DE | 19820044 | 11/1998 |
| DE | 102008021935 | 11/2009 |
| GB | 1 241 122 | 7/1971 |
| GB | 2 120 195 | 11/1983 |

* cited by examiner

*Primary Examiner* — Jimmy T Nguyen
(74) *Attorney, Agent, or Firm* — Jacobson Holman, PLLC.

(57) ABSTRACT

A screw conveyor, in particular as screw conveyor in a pressing screw device for material to be dried, for example moist or wet waste, consists of a shaft that can be supported on bearings rotatably in the pressing screw device, and at least one spiral screw provided on the shaft to convey the material to be dried in the pressing screw. The spiral screw is formed of at least two elements, such as, for example, a basic element and at least one cover element, and at least one of the elements of the spiral screw is designed exchangeably and removably, respectively.

20 Claims, 5 Drawing Sheets

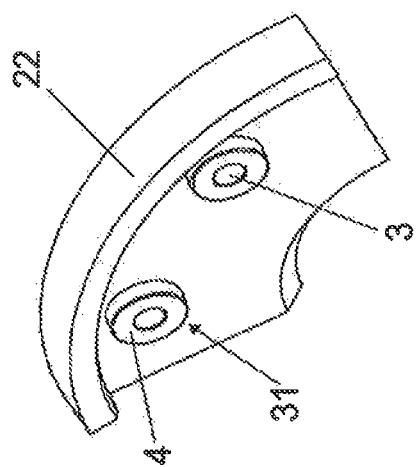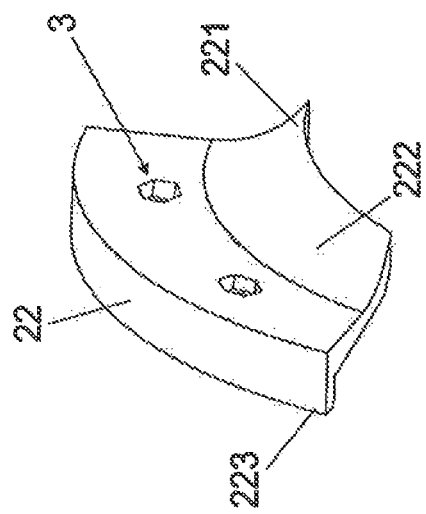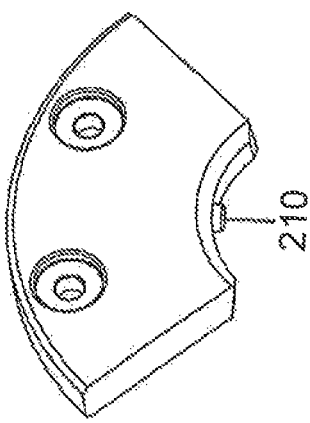

SCREW CONVEYOR

This is a national stage of PCT/EP11/004537 filed Sep. 8, 2011 and published in German, which has a priority of German no. 20 2010 012 454.9 filed Sep. 10, 2010, hereby incorporated by reference.

BACKGROUND OF THE INVENTION

The invention refers to a screw conveyor, in particular as screw conveyor in a pressing screw device for material to be dried, such as for example moist or wet waste, consisting of a shaft that can be supported on bearings rotatably in the pressing screw device, and at least one spiral screw provided on the shaft for conveying the material to be dried in the pressing screw.

SUMMARY OF THE INVENTION

The pressing screw devices, in which the screw conveyor according to the invention can be installed, are known. They serve for the pressing and simultaneous drying of bulk material, in particular moist or wet waste. The material to be pressed and dried is here filled in an inlet and conveyed by a screw conveyor in the housing of the pressing screw device against a pressing cone. Between the pressing cone and an outlet, a gap is provided through which the pressed and dried material can leave. The liquid escaping from the pressed and dried material is, as a rule, removed from the main housing, and the pressed and dried material gets preferably below the pressing cone either in a collecting device or on a conveyor belt that removes it appropriately. Of course, it is also possible to provide appropriate containers there which are then filled by the pressed or dried material. The screw conveyors in the described pressing screw devices are exposed to a high stress because of the material to be pressed and dried. The material to be pressed and dried contains, in particular, contaminations that lead to a high wear of the spiral screw. The spiral screw is, as already mentioned before, fixedly arranged on the shaft of the screw conveyor in the state of the art. As a rule, the spiral screw is directly welded on the shaft. When wear occurs, then either hard-facings have to be executed with appropriate mechanic effort, as after welding-on, for example, the welded parts have to be partially abraded, or the spiral screw is so worn off that has to be removed completely from the shaft, so that a new spiral screw can be attached to the shaft. As already mentioned, this is generally performed by welding.

From DE 10 2008 021 935 A1 a screw press as described before has become known where the head section of the spiral screw is configured exchangeably. The solution presented in this citation is complicated and difficult to manufacture. The main section of the spiral screw, that is also exposed to nearly the same wear, is unprotected.

Furthermore, from citation DE 198 20 044 A1 a wear shoe for a screw press is known. This is laborious to manufacture, namely by sintering a wear coating, and then welded on the spiral screw. When the wear shoe is worn out, the entire spiral screw has to be coated anew.

Referring to this state of the art, it is the problem of the invention to provide a screw conveyor, in particular as screw conveyor in a pressing screw device for material to be dried, that can be easily exchanged when worn out, and which, in particular, reduces the costs for maintaining the pressing screw device.

The problem of the invention is solved by a screw conveyor, in particular as screw conveyor in a pressing screw device for material to be dried, for example moist or wet waste, consisting of a shaft that can be supported on bearings rotatably in the pressing screw device, and at least one spiral screw provided on the shaft for conveying the material to be dried in the pressing screw, that is characterized in that the spiral screw is formed by at least two elements, such as, for example, a basic element and at least one cover element, and at least one of the elements of the spiral screw is designed such that it can be exchanged and removed, respectively. By providing, for example, a basic element covered by a cover element, the wear now occurs only at the cover element, and the basic element remains essentially undamaged. When servicing is required, then the cover element can be removed from the basic element and be replaced by a new cover element. Repair is done considerably faster than in the state of the art. Complex welding and abrading processes are not required anymore in the solution found now. The shaft is not required to be checked anymore either after welding has been carried out whether distortions might have occurred leading to the shaft becoming unbalanced. A post-finishing is also a very expensive procedure that can be completely done without according to the invention. It is also possible, for example, that, if the cover element consists of single parts or segments, only damaged parts or segments of the cover element are replaced. The basic element and the other undamaged cover parts may remain on the shaft. Accordingly, the invention has essential advantages compared with the solutions known from the state of the art and completely solves the problem according to the invention. While in the solutions known from the state of the art either the entire spiral screw or at least a complete part of the spiral screw has to be exchanged, now, because of the embodiment with a base and a cover element, repairing is possible without the entire spiral screw having to be removed, and, in particular, even only a partial exchange of heavily worn-out cover elements. This advantage will be even more evident in an embodiment that will be described later on with a segment-like configuration.

According to a development of the screw conveyor according to the invention it is provided that the cover element is designed such that it can be changed or exchanged. This is in particular an advantage when the spiral screw is formed by several segments, at least by the cover element. Providing only a partial exchange is possible then when, for example, certain parts of the spiral screw are stressed more than others. Accordingly, in a clever embodiment of the invention, it is provided that at least the cover element is designed such that it can be assembled segment-like. The thus occurring advantages have already been described.

An essential aspect of the screw conveyor according to the invention is given by the fact that the cover element covers the basic element at least laterally on one side and at the side facing outwards. This prevents wear, for example, at the basic element, wear will then only occur at the cover element so that the result will be a high durability of shaft with attached basic element through the solution according to the invention.

According to a development, the invention is characterized in that also the basic element is formed as attachment element. The result will be that during manufacturing the conveyor screw according to the invention, also the basic element can be attached to the prepared shaft in a rather simple way. It is an essential advantage here when the basic element as attachment element then can be fastened by means of a welding seam at or on the shaft. Generally, appropriate chamfers can be found at the edges facing the shaft when employed as intended.

A modification of the invention suggests that the basic element can be connected releasably fixedly with the shaft. This modification links the advantages of the exchangeable cover element here with the advantage that the basic element can also be exchanged by connecting it releasably fixedly with the shaft. It may be the case here that, for example, coarser or more contaminated material has to be pressed, despite the cover with a cover element damage will occur at the basic element. In this case of damage, then also the basic element can be removed rather easily from the shaft and exchanged without any problems.

A development of the solution described before suggests that the basic element is formed segment-like to arrange it preferably only in sections of the shaft. The reason for this configuration is saving material by arranging the basic element only in sections on the shaft. The cover element forms, of course, a completely continuous screw conveyor for the material to be pressed. Accordingly, then less basic elements are provided on the shaft resulting in saving material. Besides, when used as intended, the screw conveyor moves easier as its weight is less.

It is an advantage when at the basic element at least one fixing peg is provided. By means of the fixing peg/s then the basic element can be put on or attached to easily in the bore holes or grooves provided for that on the shaft, and can be aligned without any problem. This makes producing the screw conveyor according to the invention easier.

The basic element according to the invention is made from metal, preferably steel sheet. However, this does not exclude that the basic element can also be formed as cast element. An embodiment as cast element is an advantage when, for example, the basic element is designed as attachment element and is connected releasably fixedly with the shaft. Casting is not suitable if the basic element has to be welded as casting and steel cannot be connected by welding.

The invention suggests that for connecting the basic element with the cover element connection interfaces corresponding with each other are provided. These connection interfaces are designed such that, when the cover element is attached or put on, they match exactly so that, for example, bore holes in both elements are provided that are connected by means of a suitable machine screw.

Accordingly a development of the invention is characterized in that the connection interface is defined by at least one screw connection with appropriate bore holes in basic element and cover element.

According to the invention, it has been found furthermore to be an advantage when basic element and cover element have at least a form-locking connection in addition or alternatively to the connection interface corresponding with each other when built-in and producing the form-locking connection. Therefore, it is in particular advantageous when the connection interface is provided as screw connection, and additionally at least one other additional form-locking connection is provided. Here cleverly the form-locking connection can be arranged such that it works along with connection interface by providing, for example, appropriate knobs, tongues or bolts on one of the elements, basic element or cover element, and on the other of the elements then accordingly a suitable depression, such as for example a recess, a bore hole or a groove. The bore hole has to be configured here preferably as basic bore hole that does not pass completely through the element.

It is an advantage here when the form-locking connection is defined by hat-like elevations on one of the elements and by corresponding recesses on the other of the elements.

A particularly advantageous embodiment of the additional form-locking connection is given by the fact that at the basic element an open "U" pointing outwards or a groove open on top is provided in which the hat-like elevation can be put or slid in. Now the cover element can be put, for example, from the outside or directly from above on the basic element. This makes mounting easier.

Alternatively, of course the form-locking connection can be defined, according to a development, by a tongue and groove connection, or by pins, bolts or the like. The invention is here not limited to a single embodiment.

A screw conveyor as described before is characterized, according to another aspect of the invention, in that at the point where at least two meeting basic elements connect a catch is provided formed preferably like an acute triangle. This catch is then covered at a corresponding triangle provided at the cover element so that another form-locking connection occurs here. This guarantees in particular that the power acting on the cover element can be transferred safely to the shaft via the basic element. This formed catch can be produced, by the way, without any problems during manufacturing when the screw conveyor according to the invention is produced, for example by putting the basic element in sections as weld-on plates on the shaft. Because of the pitch of the spiral screw or the screw, these catches form by themselves if the basic elements are not adapted to the shape of the screw. This is performed, as already mentioned, by cover elements having an appropriate catch or shoulder there. This leads to two advantages, namely that the basic elements can be manufactured technically considerably easier, and at the same time, the application of force from the cover element in the shaft can be performed via the basic element.

Accordingly, an embodiment of the before described modification is characterized in that at the opposite side of the catch, that is covered by the cover element when employed as intended, a carrier surface is provided on which a segment of a cover element is supported during conveying the material to be pressed. The carrier surface in the cover element can be designed such that it is located at the end of the segment. However, the construction can also be configured such that it is located, for example, at any point of the cover element, except at the end, and that then the next segments of the cover element that have to be attached accordingly, are configured correspondingly. On the side where the material to be conveyed or pressed is moved or pressed, the spiral screw with the cover elements is very smooth and designed without any gaps occurring during processing, so that the material to be pressed can be conveyed through the screw without any problems and without leaving any remains.

It is also an advantage when the cover element has a protrusion covering the basic element when employed as intended, and thus protects it. This protrusion can be provided in the simplest embodiment as flange-like catch. Of course, this protrusion can also be configured such that it embraces the basic element completely at least on the outside.

In order to make the material flow easier, at the cover element on the side opposite the basic element during assembly, a shaping is provided tapering towards the shaft. This shaping is designed preferably as curvature and is peaked in conveying direction. This means an improvement of material transport within the screw.

The invention also provides a pressing screw device having at least one screw conveyor as described before.

BRIEF DESCRIPTION OF THE DRAWINGS

In the following the invention will be described by way of examples.

In the figures.

DETAILED DESCRIPTION OF THE INVENTION

Figure 1:
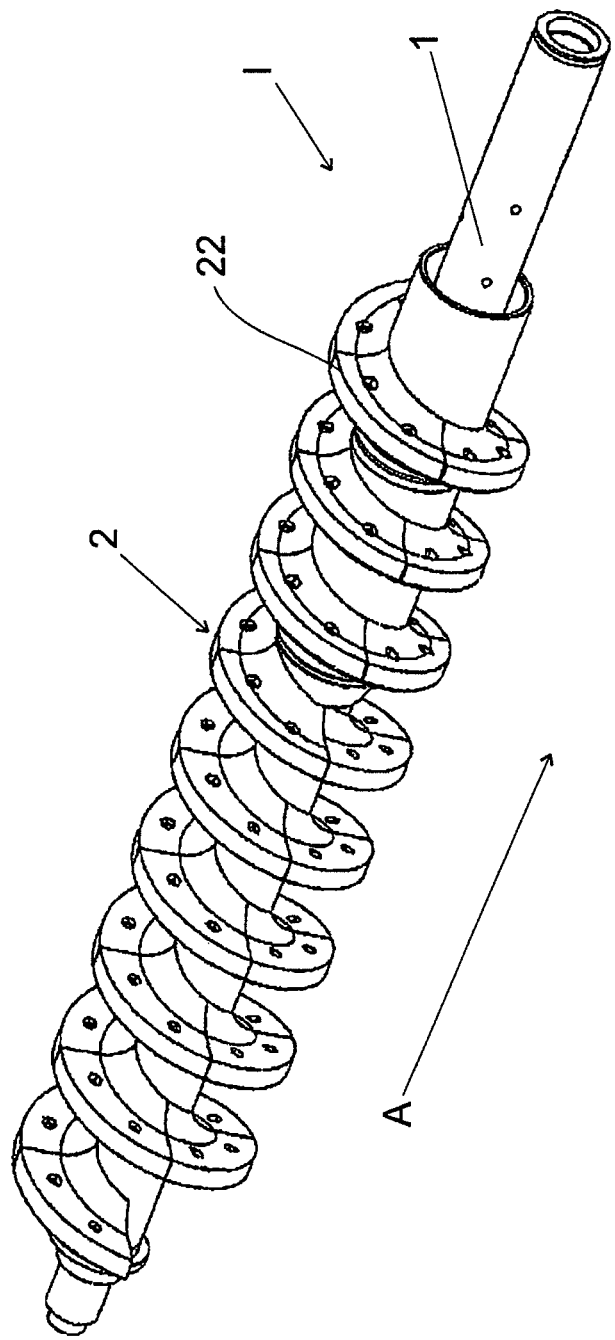
FIG. 1 View of an embodiment of the screw conveyor according to the invention in opposite direction of the conveying direction, FIG. 2 Embodiment according to FIG. 1 seen from the side of the conveying direction, FIG. 3 Section of a part of the screw conveyor with elements of the spiral screw, FIG. 4 Another section of the screw conveyor according to the invention with only partly attached cover element, FIG. 5 and FIG. 6 Cover element according to the invention, seen from two different directions, FIG. 7 Basic element according to the invention.

A screw conveyor I according to the invention is shown in the direction opposite the conveying direction A in FIG. 1. This is a three-dimensional representation where it can be seen that a spiral screw 2 is configured on a shaft 1. A shaft section with a larger diameter (not indicated in detail) can be seen here on the shaft 1. This can be, for example, an attached pipe. However, in the pressing screw devices of the applicant usually a sort of a labyrinth sealing is formed at the side showing the pipe section to which, for example, the pressing cone is linked. However, this is not shown here as it is not decisive for the invention. The spiral screw 2 is formed by the basic elements 21 (not visible in FIG. 1) and cover elements 22. These cover elements 22 are put on the basic element 21 in such a way that they cover this completely at least at the front side of the spiral screw 2 and at the side facing outwards.

Figure 2:
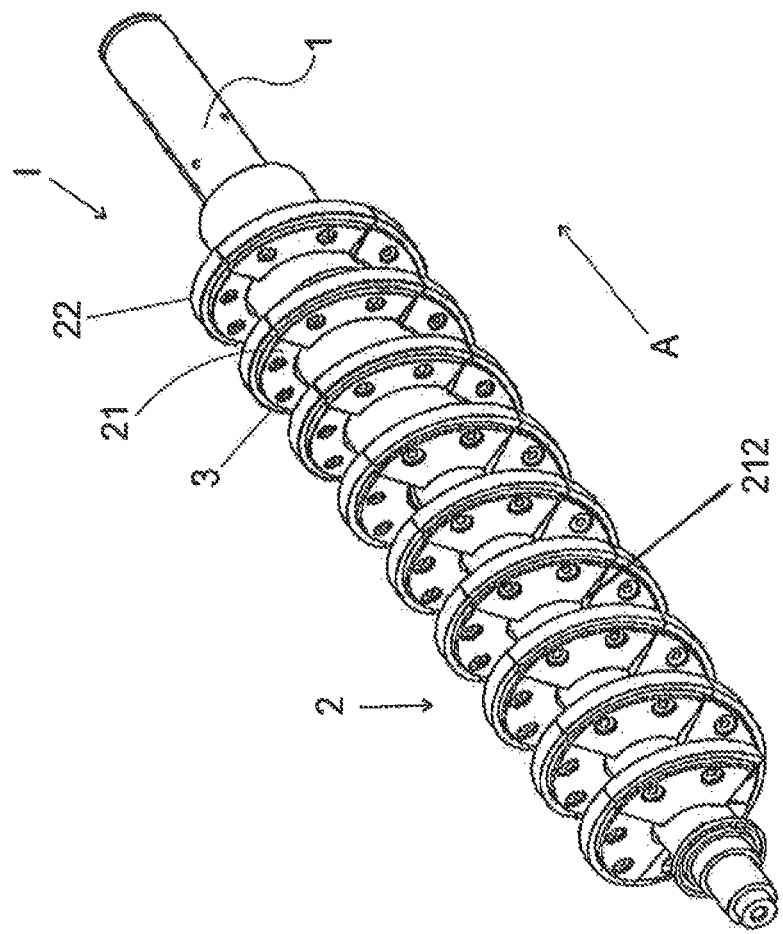

FIG. 2 shows the screw conveyor I according to the invention, analogously to the representation of FIG. 1, however seen here from the exactly opposite direction, namely the direction of conveying A. In this representation now also the basic elements 21 become visible that are arranged, as it can be seen, in the shape of single segments around the shaft so that the spiral screw is formed. The single basic elements are here arranged staggered such that a catch 212 forms, each time at the seam between two meeting basic elements 21. This may be, for example, a result of the fact that the basic element segments are made from single sheets that are then welded suitably staggered on the shaft 1 to form the spiral screw. The cover elements 22 are slipped or guided over the basic elements 21 so that a continuous screw is the result, as it can be seen very nicely in FIG. 1, that does not have any catches. The advantage in the production of the embodiment is, on the one hand, that the basic elements 21 can be produced considerably easier, and they can also be attached to the shaft 1 more convenient. On the other hand, advantageously at the same time a third form-locking connection occurs resulting from the fact that in the cover element 22 carrier counter surfaces, that cannot be seen in the figures, are formed that lead the force applied on the screw during the pressing process safely away via the basic element 21 to the shaft 1.

Figure 3:
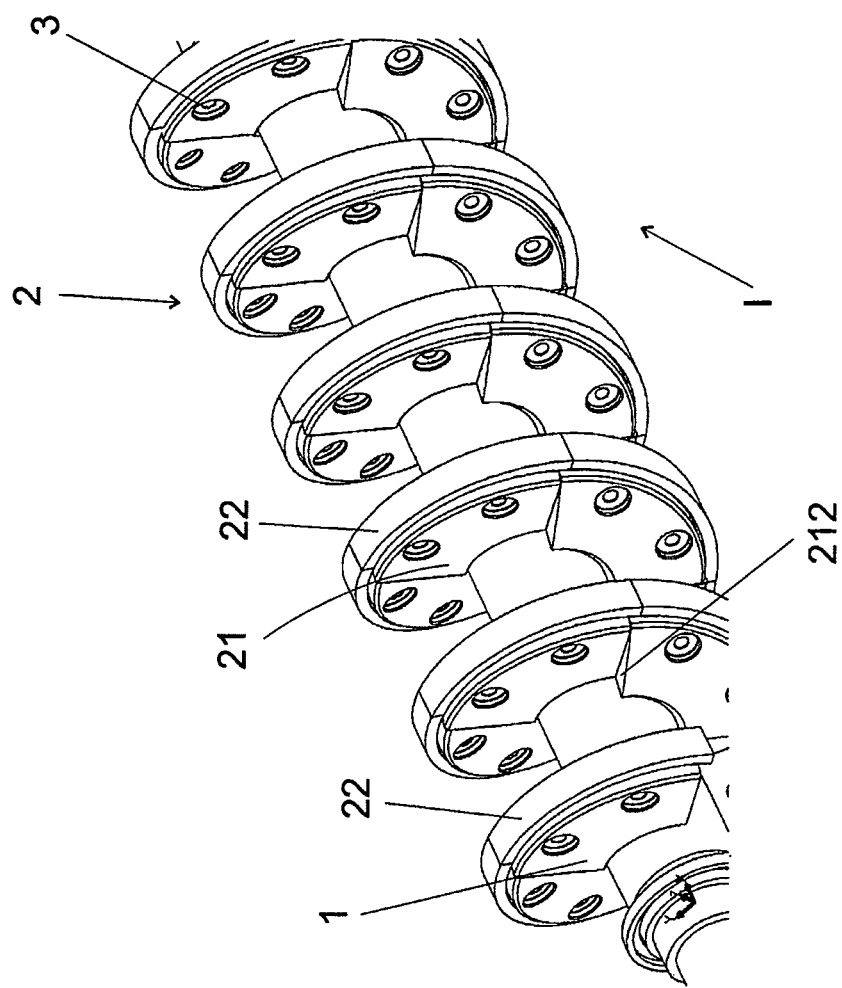

FIG. 3 shows a shaft section of shaft 1 with attached basic elements 21 and attached cover elements 22. It can be seen very clearly that the cover elements 22 and the basic elements 21 are connected to each other by means of an interface 3 that is, for example—as it can be seen—defined by a screw connection. This means, that at the interface 3 not shown screws are guided through the bore holes provided there, and screwed together for the final state. Conveniently the screws are provided with appropriate safety devices, such as, for example, self-locking nuts, tongue joints or the like. The representation according to FIG. 3 corresponds with the view or the direction shown in FIG. 2.

Figure 4:
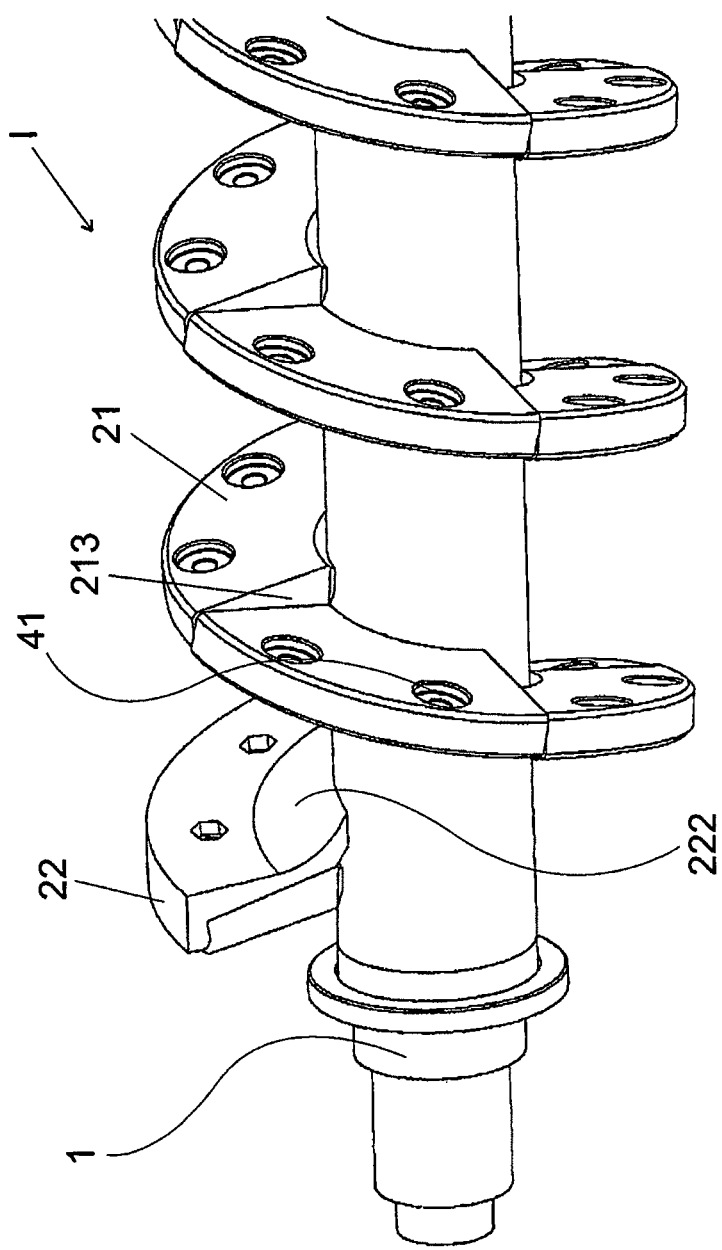

FIG. 4 shows a section of the shaft 1 with only partly arranged cover element 22. As it can be seen in this figure the basic elements 21 are lined up to each other such that the already described carrier surface 213 arises at the point where the basic elements join. Cleverly, the invention comprises another form fit as form-locking connection 31. This form-locking connection 31 is present in the shown embodiment additionally to the connection interface 3, and this is two times per segment. The shown form-locking connection 31 is formed here by hat-like elevations 4 (see FIG. 6) and corresponding recesses 41, as it can be seen in FIG. 4. The hat-like elevations 4 are provided for example on the cover element 22, and engage in the corresponding recesses 41 on the basic element 21. Of course, also the exactly reversed embodiment can be chosen, where the hat-like elevations are provided on the basic element 21 and the corresponding recesses 41 on the cover element 22. In FIG. 4 only one cover element 22 can be seen. At this cover element, a shaping 220 is provided extending towards the shaft 1 that tapers towards the shaft. It can be seen very nicely in FIG. 5 that the shaping 222 is designed as curvature and is peaked in the conveying direction A. The peak is indicated by 221 in FIG. 5.

FIGS. 5 and 6 show the cover element 22 for the screw conveyor according to the invention from two different directions. Thus, the cover element 22 can be seen from the side that is, when used as intended, the conveying side, that is the side on which the material moves against the pressing cone. FIG. 6 shows the side in contact with the basic element 21, when used as intended. Accordingly this side cannot be seen after assembling or when used as intended.

FIG. 7 shows a basic element 21 with a fixing peg 210 on the side facing the shaft. By means of this fixing peg the attachment element 21 is put on the shaft and aligned there. For that on the shaft 1 corresponding bore holes or grooves are provided serving for aligning. Reference number 5 indicates the bore hole as part of the connecting point 3 that is provided corresponding each time to one another at the basic element 21 as well as at the cover element 22. It can also be seen in FIG. 5 that at the cover element a protrusion 223 is provided covering and thus protecting the basic element 21 during the intended use. According a not shown modification of the invention, the embodiment shown in FIG. 7 can be configured such that the recess 41 is defined by an open "U" pointing outwards or by a groove open on top that can then be put in the hat-like elevation 4. Such a design would then also allow an embodiment of the cover element 22 where the protrusion is designed also U-shaped or U-like, so that the basic element is protected, at least partly, from both sides.

The invention has been described before by means of examples. However, the invention is not restricted to them. The claims filed now and to be filed later on along with the application are attempted formulations without prejudice for obtaining a broader protection.

References in the sub-claims refer to the further design of the subject matter of the main claim by the characteristics of the respective sub-claim. These are, however, not to be understood as a waiver for obtaining independent, subjective protection for the characteristics of the referred sub-claims.

Characteristics disclosed so far only in the description may now, in the course of proceedings, be claimed as of inventive relevance, for example to distinguish from the state of the art.

The invention claimed is:

1. A screw conveyor in a pressing screw device for material to be dried consisting of a shaft that can be supported on bearings rotatably in the pressing screw device, and at least one spiral screw provided on the shaft for conveying the material to be dried in the pressing screw device, wherein the spiral screw is formed of at least two elements, including a basic element and at least one cover element for covering the basic element, and at least one of the at least two elements of the spiral screw is configured exchangeably and removably, respectively and a catch in a form of an acute triangle is protruded outwardly from along a connection point between the basic element and a neighboring basic element for receiving the cover element.

2. The screw conveyor according to claim 1, wherein the at least one cover element is designed exchangeably and removably, respectively.

3. The screw conveyor according to claim 1, wherein at least the at least one cover element is designed such that it can be assembled segment-like.

4. The screw conveyor according to claim 1, wherein the at least one cover element covers the basic element at least laterally on one side and at the side facing outwards.

5. The screw conveyor according to claim 1, wherein the basic element is configured as an attachment element and the basic element is configured as the attachment element that can be attached by a welding connection at or on the shaft.

6. The screw conveyor according to claim 1, wherein the basic element can be connected releasably with the shaft.

7. The screw conveyor according to claim 1, wherein the basic element is formed segment-like to arrange it only in sections on the shaft and at the basic element at least one fixing peg is provided.

8. The screw conveyor according to claim 1, wherein the basic element is formed of metal steel sheet or as a cast element.

9. The screw conveyor according to claim 1, wherein the basic element and the at least one cover element have corresponding connection interfaces.

10. The screw conveyor according to claim 1, wherein the basic element and the at least one cover element have corresponding connection interfaces and the connection interface is defined by at least one screw connection with appropriate bore holes in the basic element and the at least one cover element.

11. The screw conveyor according to claim 1, wherein the basic element and the at least one cover element have at least one form-locking connection additionally or alternatively to a connection interface corresponding with each other when built in to form the form-locking connection.

12. The screw conveyor according to claim 1, wherein the basic element and the at least one cover element have at least one form-locking connection and the form-locking connection is defined by hat-shaped elevations on one of the at least two elements and by corresponding recesses on the other of the at least two elements.

13. The screw conveyor according to claim 1, wherein the basic element and the at least one cover element have at least one form-locking connection and the form-locking connection at the basic element is an "U" open on the side pointing outwards or as groove open on top in which a hat-shaped elevation can be put or slid in.

14. The screw conveyor according to claim 1, wherein the basic element and the at least one cover element have at least one form-locking connection and the form-locking connection is defined by a tongue-and-groove-connection, or by pins or bolts.

15. The screw conveyor according to claim 1, wherein at the opposite face of the catch, covered by the at least one cover element when used as intended, a carrier surface is provided on which a segment of the at least one cover element is supported during conveying the material to be pressed.

16. The screw conveyor according to claim 1, wherein at the opposite face of the catch at the basic element, covered by the at least one cover element when used as intended, a carrier surface is provided on which a segment of the at least one cover element is supported during conveying the material to be pressed and the at least one cover element has a further protrusion covering and thus protecting the basic element during the intended use.

17. The screw conveyor according to claim 1, wherein at the at least one cover element on the side opposite the basic element during assembly a shaping is provided tapering towards the shaft.

18. The screw conveyor according to claim 1, wherein at the at least one cover element on the side opposite the basic element during assembly a shaping is provided tapering towards the shaft and the shaping is designed as curvature and is peaked in a conveying direction.

19. A pressing screw device for material to be dried comprising at least one screw conveyor, wherein the screw conveyor consists of a shaft that can be supported on bearings rotatably in the pressing screw device, and at least one spiral screw provided on the shaft for conveying the material to be dried in the pressing screw device, wherein the spiral screw is formed of at least two elements, including a basic element and at least one cover element for covering the basic element, and at least one of the at least two elements of the spiral screw is configured exchangeably and removably, respectively and a catch in a form of an acute triangle is protruded outwardly from along a connection point between the basic element and a neighboring basic element for receiving the cover element.

20. The screw conveyor according to claim 8, wherein the metal steel is a steel sheet.

* * * * *